United States Patent
Castillo et al.

[19]

[11] Patent Number: 6,076,559
[45] Date of Patent: Jun. 20, 2000

[54] PROTECTIVE COVER FOR PLUMBING FIXTURES

[75] Inventors: Gregory N. Castillo, 192 Tharp Dr., Moraga, Calif. 94556; Bradley E. Castillo, San Ramon, Calif.

[73] Assignee: Gregory N. Castillo, Moraga, Calif.

[21] Appl. No.: 09/306,655

[22] Filed: May 6, 1999

Related U.S. Application Data

[63] Continuation-in-part of application No. 08/843,579, Apr. 16, 1997, Pat. No. 5,921,282.

[51] Int. Cl.[7] ...................................................... F16L 55/10
[52] U.S. Cl. ........................... 138/89; 138/96 R; 220/784; 215/317
[58] Field of Search ............................. 138/89, 89.1–89.4, 138/96 R; 220/780, 784, 793, 296; 215/317, 321, 43

[56] References Cited

U.S. PATENT DOCUMENTS

| | | | |
|---|---|---|---|
| 1,934,681 | 11/1933 | Damsel | 138/89 X |
| 2,508,044 | 5/1950 | Seddon | 25/128 |
| 2,543,960 | 3/1951 | Elmer | 138/96 T |
| 3,048,911 | 8/1962 | Almon | 25/118 |
| 3,276,176 | 10/1966 | Jonsson et al. | 52/309 |
| 3,372,834 | 3/1968 | Ayotte et al. | 220/60 |
| 3,421,551 | 1/1969 | Currier | 138/178 |
| 3,583,596 | 6/1971 | Brewer | 220/60 |
| 3,800,486 | 4/1974 | Harvey | 138/96 R |
| 3,814,278 | 6/1974 | Beierle | 220/60 |
| 4,052,759 | 10/1977 | Hill | 4/252 R |
| 4,112,979 | 9/1978 | Widdicombe | 138/89 |
| 4,212,486 | 7/1980 | Logsdon | 138/96 R |
| 4,303,102 | 12/1981 | Hugley | 138/96 R |
| 4,482,161 | 11/1984 | Izzi, Sr. | 277/207 A |
| 4,501,301 | 2/1985 | Snow, Sr. et al. | 138/96 T |
| 4,623,170 | 11/1986 | Cornwall | 285/4 |
| 4,706,841 | 11/1987 | Grajek | 220/375 |
| 4,754,895 | 7/1988 | Lardner et al. | 220/288 |
| 4,856,674 | 8/1989 | Berney | 220/258 |
| 4,906,496 | 3/1990 | Hosono et al. | 138/113 X |
| 4,967,422 | 11/1990 | Novak | 138/96 R |
| 5,003,735 | 4/1991 | Bates | 138/104 X |
| 5,071,001 | 12/1991 | Ryman, III | 220/601 |
| 5,099,887 | 3/1992 | Hooper | 138/89 |
| 5,224,515 | 7/1993 | Foster et al. | 138/96 T |
| 5,368,178 | 11/1994 | Towns et al. | 215/317 |
| 5,538,154 | 7/1996 | Von Holdt | 220/277 |
| 5,540,342 | 7/1996 | Rathbun | 215/225 |
| 5,540,349 | 7/1996 | Phillips | 220/306 |
| 5,623,971 | 4/1997 | Foernzler | 138/89 |
| 5,722,554 | 3/1998 | Chanal et al. | 220/319 |

*Primary Examiner*—Patrick Brinson
*Attorney, Agent, or Firm*—Medlen & Carroll, LLP

[57] ABSTRACT

The present invention provides a disposable protective cover which securely yet releasably attaches to a conventional plumbing fixture via locking tabs, thereby reserving an annular space around the fixture and the underlying pipe during floor construction and allowing easy and rapid access to the fixture once the floor construction has been completed.

15 Claims, 7 Drawing Sheets

PROTECTIVE COVER FOR PLUMBING FIXTURES

RELATED APPLICATION DATA

This is a continuation-in-part of U.S. patent application Ser. No. 08/843,579 filed on Apr. 16, 1997, now U.S. Pat. No. 5,921,282.

FIELD OF THE INVENTION

The present invention relates generally to the field of embedded plumbing devices. More particularly, the present invention relates to detachable protective covers useful for the installation of plumbing fixtures.

BACKGROUND OF THE INVENTION

The installation of floor drains and floor cleanouts during building construction is often complicated by the permanent nature of the concrete floor into which they are set. The construction process is problematic in that the tops of the fixtures must be protected during pouring and setting of the concrete floor, both to prevent seepage of concrete into the screw holes and grates incorporated into the fixtures, and to avoid damage to the delicate bronze finish of the tops. Moreover, in order to assure a substantially planar floor surface after the concrete floor has been placed and cured, an adjustment of the height of these embedded devices is often necessary, and adequate space must be reserved around the fixtures to allow for this final adjustment.

Various devices have been described in the prior art to protect plumbing pipes and the like during floor installation. For example, U.S. Pat. No. 3,421,551 to Currier discloses a foamed plastic sleeve, which is placed over a pipe to be embedded in concrete so as to reserve an annular space around the pipe. The sleeve is designed to fit frictionally over a conventional four-inch pipe, and can be cut away after the floor material has set, allowing access to the pipe. Of similar design and utility are U.S. Pat. Nos. 3,800,486 to Harvey, 3,048,911 to Ahnon, 3,276,176 to Jonsson et al., 4,212,486 to Logsdon, 4,112,979 to Widdicombe, 4,967,422 to Novak, and 2,508,044 to Seddon. Unfortunately, these existing devices are designed to attach to the pipe itself, and cannot accommodate more conventional plumbing fixtures such as the floor drains and cleanouts now in widespread use in the construction industry. See, e.g., FIG. 1. Thus, the ubiquitous use of these modem plumbing fixtures has created a new and unique problem which has not been addressed by the prior art.

Since the prior art protective devices cannot accommodate these types of plumbing fixtures, plumbers and other construction workers have been left to rely on wrapping the drains and cleanouts with masking tape or the like in order to protect the fixtures, a technique which is both time consuming and very labor intensive. Plumbers typically charge $1.00 per minute or more for their services, and the cost of wrapping, and then locating and unwrapping, each floor drain and cleanout during floor construction can quickly become prohibitive, particularly in a large building having hundreds of these fixtures. Moreover, the tape covering all too often is torn or removed during the construction process, resulting in damage to the top. Finally, an exorbitant amount of tape must be used in order to reserve a sufficient annular space around the embedded fixture.

Thus, a significant need remains in the art for a lightweight and inexpensive protective cover designed to universally accommodate modem plumbing fixtures such as floor drains, floor cleanouts and the like, rather than the underlying pipe. What is needed is a disposable cover which securely attaches to the plumbing fixture prior to floor construction, provides simple and rapid access to the fixture upon completion of the floor, and reserves sufficient annular space around the fixture for final adjustment.

SUMMARY OF THE INVENTION

Accordingly, it is an object of the present invention to remedy the disadvantages encountered in the prior art through the provision of a disposable and detachable plastic protective cover, which quickly and securely yet releasably attaches to conventional floor drains and floor cleanouts via locking tabs.

In one embodiment, the invention contemplates a disposable protective cover for protecting a plumbing fixture during floor construction, comprising a plastic tubular casing having a closed circular end wall in a top portion and an open-ended lower portion. The tubular casing further comprises a downwardly-depending skirt tapering outwardly from the closed circular end wall, with a plurality of locking tabs evenly disposed around the skirt in the top portion of the casing. In a further embodiment, the casing incorporates an outwardly-extending rim at the end of said downwardly-depending skirt.

Preferably, the plurality of locking tabs further comprise a plurality of inwardly-directed flanges having extended lower edges for releasably securing the rim of the plumbing fixture inside the casing. In a further embodiment, a plurality of centering lobes are interspersed between the locking tabs in the top portion of the casing, with the centering lobes comprising a plurality of inwardly-directed flanges having no extended lower edges.

In one embodiment of the protective cover, the inwardly-directed flanges further comprise a plurality of indentations in the closed end wall and the top portion of the skirt. In this embodiment, the indentations form a series of curved contact points, creating an inner fractionated circle having a smaller diameter than the end wall and the casing and sufficient for contacting the rim of a plumbing fixture. It is contemplated that the height of the curved contact points will generally coincide with the height of the rim of the fixture, such that the extended lower edges of the locking tabs will snap underneath the rim when the fixture is fully inserted in the casing. In an alternative embodiment, the flanges are formed by solid projections of the plastic casing extending radially inward from the top portion, without creating an indentation in either the downwardly-depending skirt or the closed circular end wall.

In another embodiment, the present invention contemplates a disposable protective cover for protecting a plumbing fixture during floor construction, comprising a plastic tubular casing having a closed circular end wall in a top portion and an open-ended lower portion. An insert is mounted inside the tubular casing against the closed circular end wall and includes a plurality of locking tabs evenly disposed around the inside of the tublar casing adjacent to the top portion. As with the other embodiments, an outwardly-extending rim is provided at the open end of said tubular casing.

The present invention also contemplates a detachably connected lid incorporated into the closed circular end wall of the casing, with a diameter or size which is preferably somewhat slightly larger than the outside diameter of the plumbing fixture. Perforations can be provided to allow for removal of the end wall once the concrete has set. Such perforations are preferably provided between the locking tabs and the open end of the casing, but may also be provided on the end wall itself or at the intersection between the casing and the end wall.

Other and further objects, features, advantages and embodiments of the present invention will become apparent to one skilled in the art from reading the detailed description of the invention together with the drawings.

DETAILED DESCRIPTION OF THE INVENTION

Figure 2:
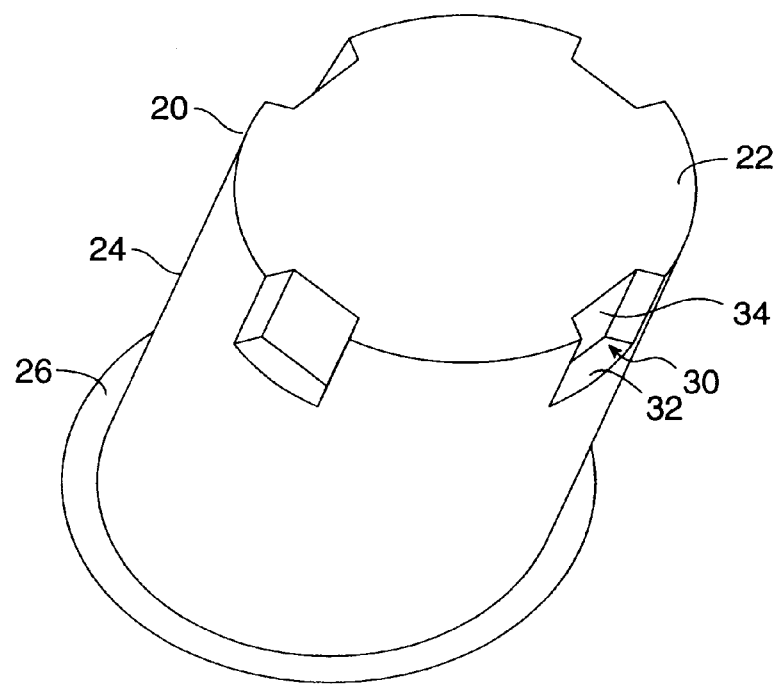
FIG. 2 is a side view of a protective cover of the present invention, with the locking tabs formed by indentations in the plastic casing and circular end wall.

Referring now to FIG. 2, one embodiment of the detachable protective cover of the present invention comprises a generally frustrum-shaped plastic casing 20, having a closed circular end wall 22 in a top portion of the casing 20, and an open-ended bottom portion. In one preferred embodiment, the casing 20 further comprises a downwardly-depending skirt 24 tapering outwardly from the closed circular end wall 22. In a particularly preferred embodiment, the skirt 24 terminates in an outwardly-extending rim 26 at the bottom of the plastic casing 20.

Figure 1:
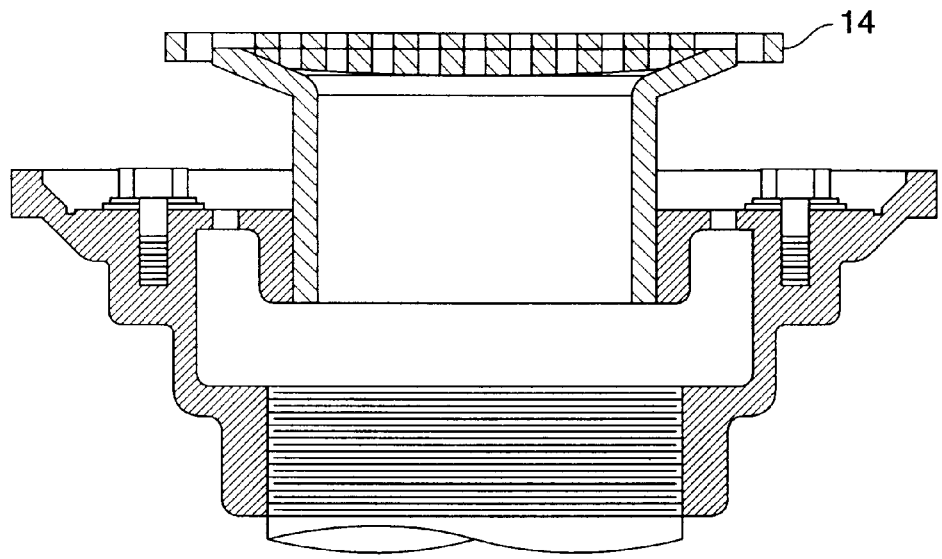
FIG. 1 is a side view of a conventional drain cover attached to an underlying plumbing pipe.

The protective cover of the present invention is designed to securely yet releasably connect with conventional plumbing fixtures, such as the adjustable floor drain illustrated in FIG. 1, via a plurality of locking tabs and centering lobes incorporated into the top portion of the casing 20. In a preferred embodiment, three locking tabs and three centering lobes are interspersed and evenly distributed around the circumference of the plastic casing 20. However, it is contemplated that any combination of two or more locking tabs would be sufficient to secure the protective cover over a fixture during floor construction.

In one embodiment each locking tab comprises a flange 30 extending radially inward from the casing 20, having an extended lower edge 32 for releasably securing the rim 14 of the plumbing fixture when inserted within the plastic casing 20. In the preferred embodiment shown in FIG. 2, the inwardly-directed flanges 30 are formed by an indentation in both the closed circular end wall 22 and the top portion of the downwardly-depending skirt 24. These indentations form a series of curved contact points 34, creating a fractionated circle having a smaller circumference than the circular end wall 22 and the outer casing 20.

It is contemplated that the circumference of this inner fractionated circle will generally equate with the circumference of the rim 14 on the floor drain illustrated in FIG. 1, or alternatively a floor cleanout fixture. In a preferred embodiment, the diameter of this inner fractionated circle ranges from approximately 8 to 12 cm, and in a particularly preferred embodiment from 9.5 to 10 cm. In an alternative embodiment, the circumference of the inner fractionated circle will be slightly smaller than the circumference of the rim of the plumbing fixture, to enable a press fit between the contact points 34 and the rim.

It is further contemplated that the height of the curved contact points 34 will generally coincide with the height of the rim 14 of the fixture, so that the extended lower edges 32 of the flanges 30 used to form the locking tabs can easily and securely snap underneath the rim 14 when the plumbing fixture is fully inserted into the casing 20. In an alternative embodiment, the flanges 30 can be utilized as centering lobes when the extended lower edge is eliminated.

Figure 3:
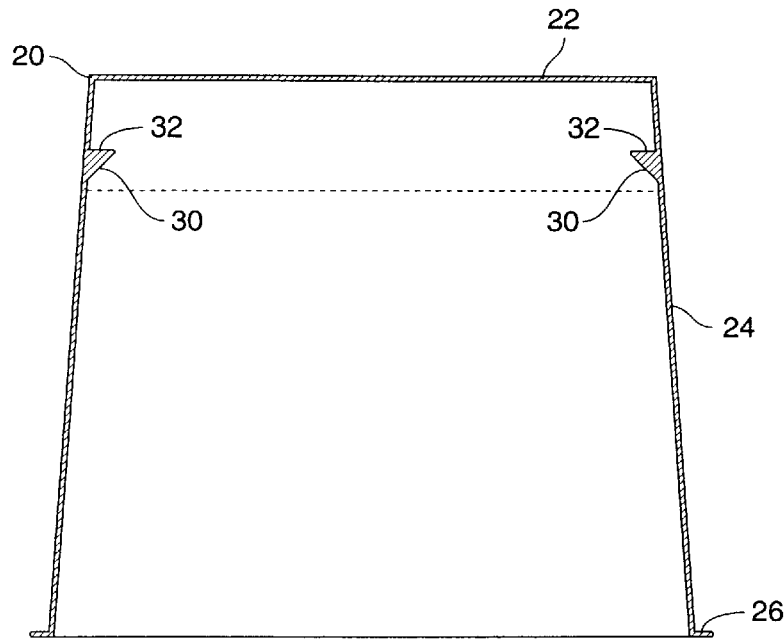
FIG. 3 is a side view of a protective cover of the present invention, with locking tabs formed by projections within the plastic casing.

Referring now to FIG. 3, in an alternative embodiment of the invention the flanges 30 and extended lower edges 32 are formed by solid projections of the plastic casing 20 extending radially inward from the top portion, without creating an indentation in the downwardly-depending skirt 24. In this embodiment, the circumference of the top portion of the casing 20 corresponds to the circumference of the rim of the fixture, so that the rim will fit snugly within the top portion of the casing 20 when fully inserted. It is further contemplated that the distance between the extended lower edge 32 on the locking tabs and the end wall 22 of the casing 20 will be substantially the same as the height of the rim of the fixture, so that the extended lower edge 32 will securely snap in place when the fixture is fully inserted. As noted previously, in an alternative embodiment the flanges may also be utilized solely as centering lobes, without the locking feature, when the extended lower edge is eliminated from the flange 30.

Figure 4:
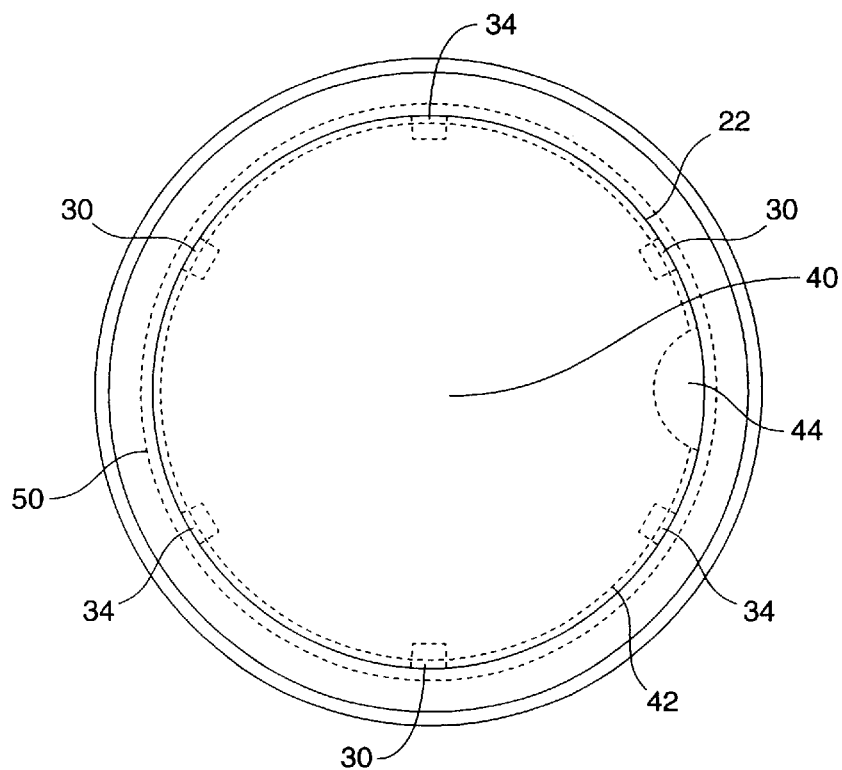
FIG. 4 is a top view of a closed circular end wall of the present invention, illustrating a detachable lid feature.

FIG. 4 illustrates an additional and preferred embodiment of the closed circular end wall 22 of the present invention, wherein the end wall further comprises a detachably connected lid 40. In one embodiment, the diameter of the lid 40 is substantially equal to the diameter of the plumbing fixture, allowing easy access to the top of the fixture once the flooring material has dried and set. In an alternative embodiment, the diameter of the detachably connected lid 40 is slightly larger than the plumbing fixture, thereby allowing access to the annular space created around the fixture and underlying pipe by the protective cover of the present invention.

It is further contemplated that the lid can be made detachable in any suitable fashion. In a preferred embodiment, a first perforation 42 is provided as depicted in FIG. 4. In a particularly preferred embodiment, the lid 40 further comprises a pull tab 44 to simplify the removal of the lid 40 once the flooring material has dried and set. Of course, the detachable lid illustrated for this particular embodiment can be easily and advantageously incorporated into the other alternative embodiments of the present invention described and depicted herein, and such modifications are considered to be fully within the scope of the claimed invention.

Figure 5A:
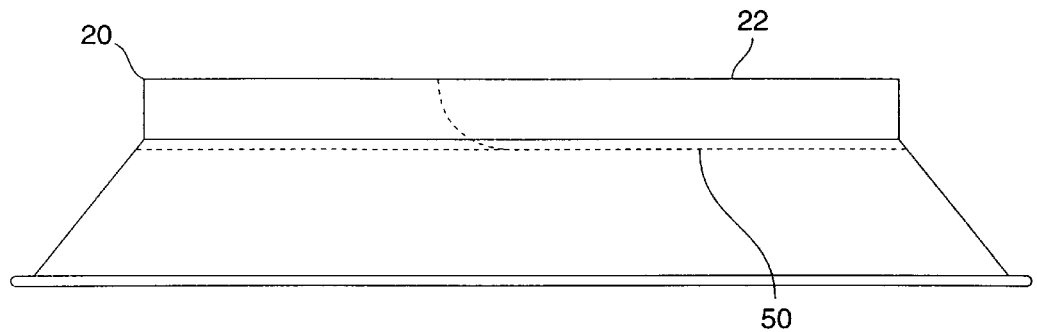
FIG. 5A is a side view of a protective cover of the present invention having both a detachable lid and a removable top portion of the plastic casing.
Figure 5B:
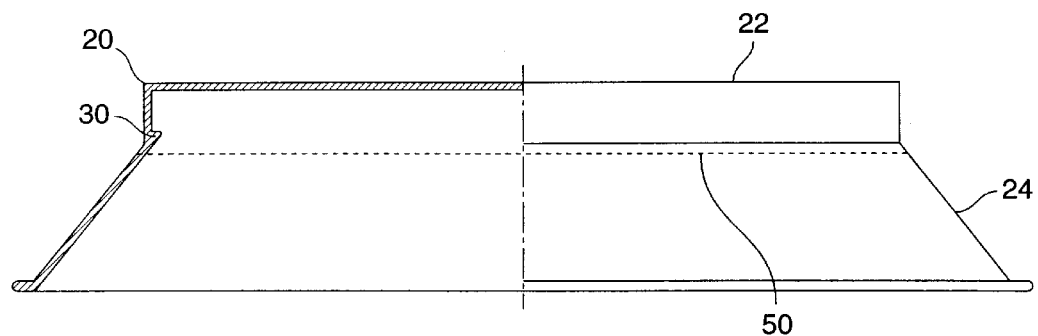
FIG. 5B is a side view of the same embodiment with a cut-away view of the locking tab formed by the projection.

In a preferred embodiment, illustrated in detail in FIGS. 5A and 5B, a second perforation 50 is provided in the top portion of the plastic casing 20, immediately beneath the flanges 30 for the locking tabs. See cutaway illustrated in FIG. 5B. In this embodiment, it is contemplated that the top portion of the casing 20 from which the flanges 30 of the locking tabs extend is substantially cylindrical in shape, and that the remainder of the downwardly-depending skirt 24 tapers outward from the second perforation 50. This embodiment provides the added advantage of allowing easy and rapid access to both the cover and the annular space surrounding the underlying pipe and plumbing apparatus. Thus, a construction worker or plumber can make the necessary adjustments to the underlying plumbing apparatus prior to filling in the annular space and completing construction of the floor.

Figure 7:
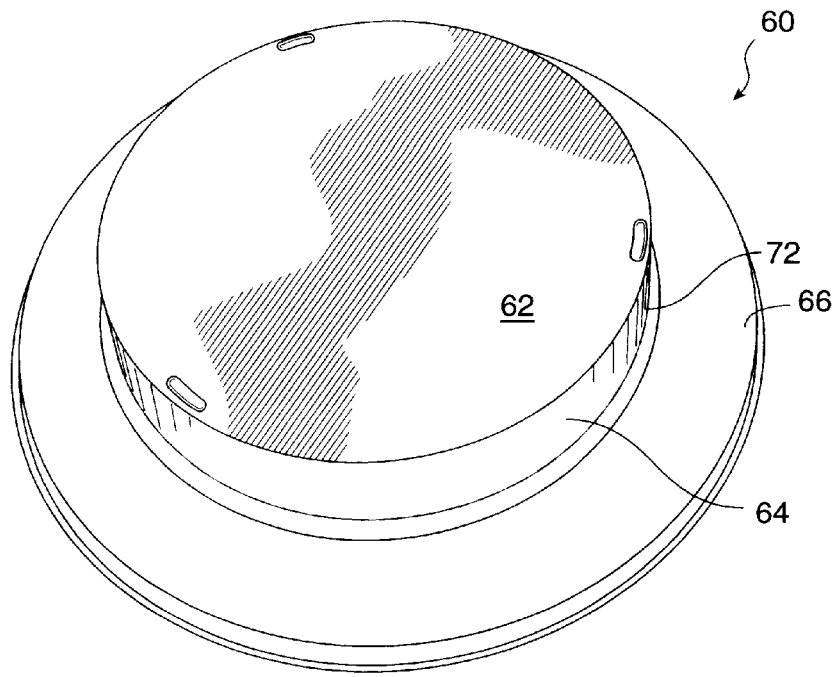
FIG. 7 is a perspective top view of a preferred embodiment of a protective cover of the present invention having a relatively short tubular casing.
Figure 8:
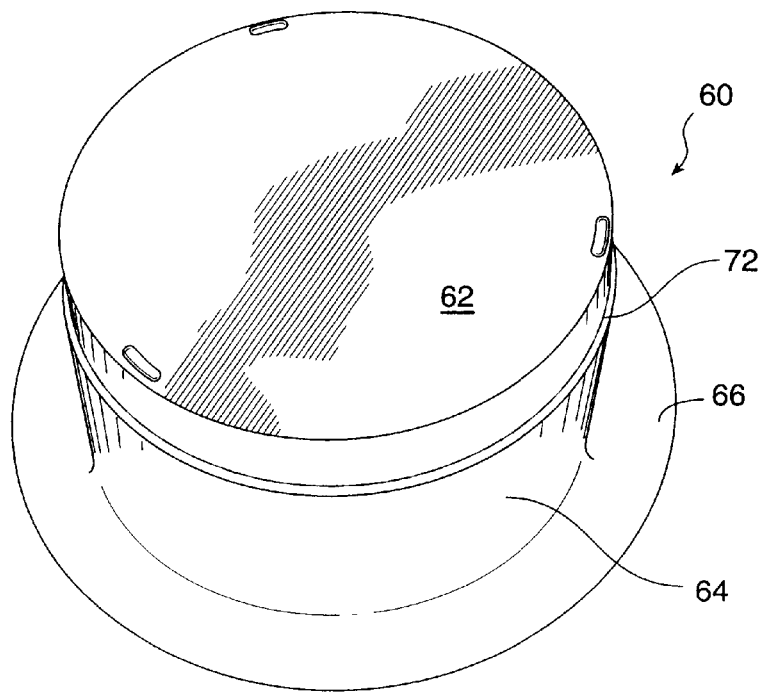
FIG. 8 is a perspective top view of a second preferred embodiment of a protective cover of the present invention having a relatively tall tubular casing.
Figure 9:
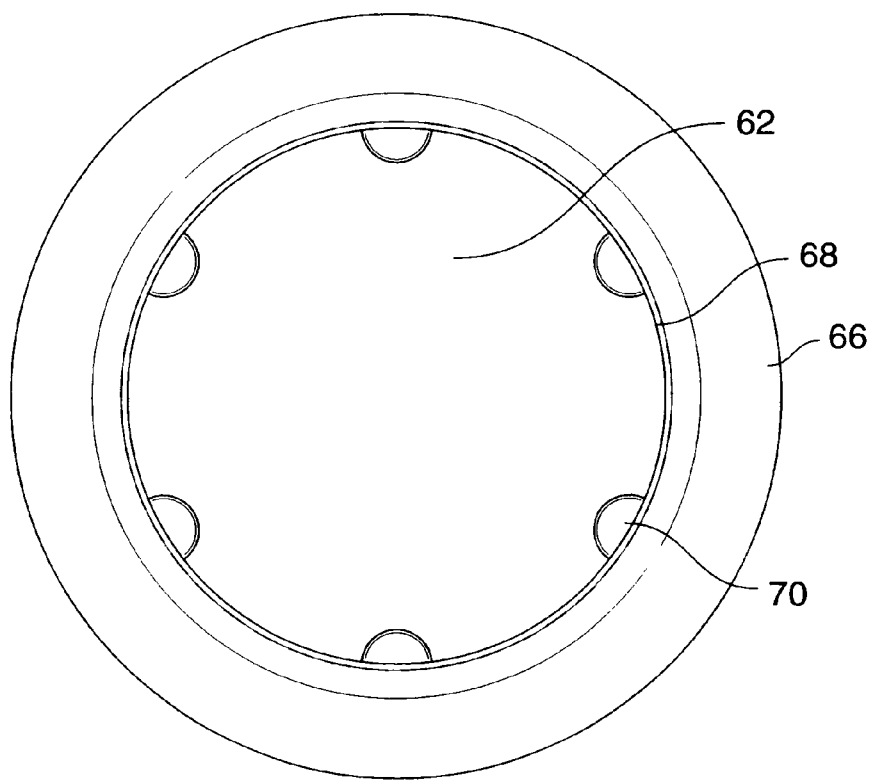
FIG. 9 is a bottom view of a protective cover shown in FIGS. 7 or 8.
Figure 10:
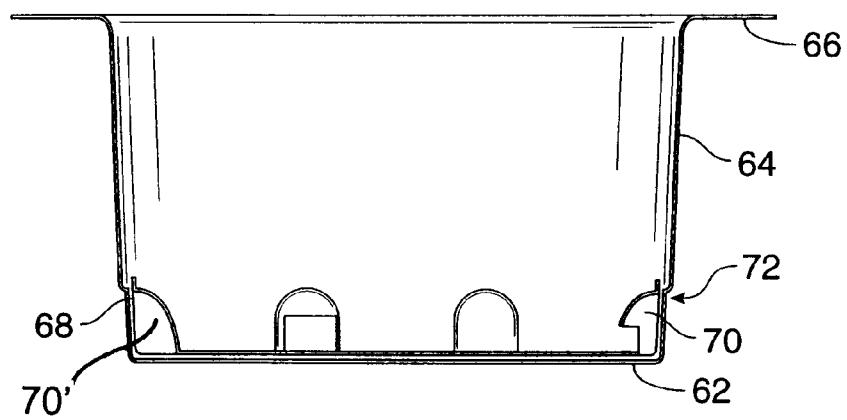
FIG. 10 is a cutaway side view of the protective cover shown in FIG. 8.

A most preferred embodiment is illustrated in detail in FIGS. 7–10. This embodiment utilizes a tubular casing 60 having one end covered by an end wall or lid 62 which is removable. Tubular casing 60 is preferably constructed using plastic and is most preferably cylindrical in shape. A rim 66 preferably circumscribes and extends substantially perpendicularly away from the open end of the tubular casing 60 to provide for further anchoring of the protective cover in its locked position over the plumbing fixture as concrete is poured and rises up towards the end wall 62. Tabs 70 are preferably substantially evenly spaced around tubular casing 60 adjacent to lid 62, to enable the protective cover to be placed over and locked onto a plumbing fixture preparatory to pouring a concrete floor. In this embodiment, tabs 70, 70' can be used to provide a spacing and/or a locking function. For example, a plurality of tabs 70 can be cut to form an inwardly extending element for engaging and locking against a plumbing fixture cover. It is also possible, if desired, to leave a plurality of tabs uncut, as illustrated by 70' of FIG. 10, to perform a spacing function. Tabs 70 and 70' form a fractionated circle having a smaller diameter than end wall 62, and one which will fit over and remain in contact with the plumbing fixture. Where both locking 70 and spacing 70' tabs are used, it is most preferable to alternate them. Thus, in the embodiment illustrated in FIG. 9, all six of the tabs could be locking tabs 70 or, althernatively, three of the tabs 70 could be locking tabs and three spacing tabs 70', with each locking tab 70 located approximately 120 degrees from any other locking tab 70, and with each spacing tab 70' located approximately 120 degrees from any other spacing tab 70'. For ease of manufacturing, the tabs 70, 70' are preferably formed on an insert 68 which is preferably bonded or adhesively attached to lid 62 and/or side wall 64 adjacent to lid 62. To provide for removal of the lid 62 and access to the plumbing fixture after the concrete has cured, perforations 72 can be provided, preferably in side wall 64, which allow the lid 62 to be easily detached from the casing 60 for removal. Alternatively, perforations could also be provided in the end wall 62 or at the intersection between end wall 62 and casing 60. In the most preferred embodiment, an upper portion of the side wall 64 is removed along with the lid 62. As shown in FIGS. 7 and 8, the height and width of the side wall 64 can be varied to accomodate a variety of plumbing fixtures and to allow for concrete floors of varying thicknesses.

Figure 6A:
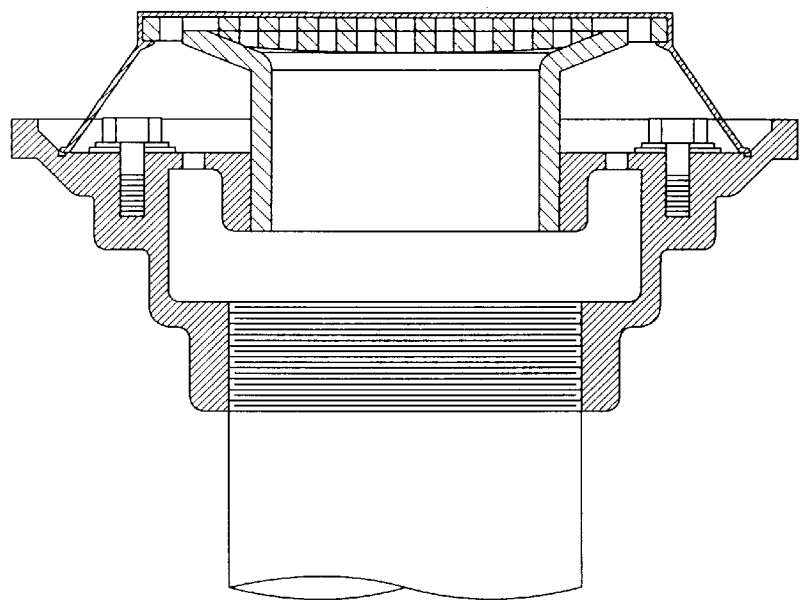
FIGS. 6A–6D illustrate the operation of a protective cover of the present invention during the construction of a concrete floor.
Figure 6B:
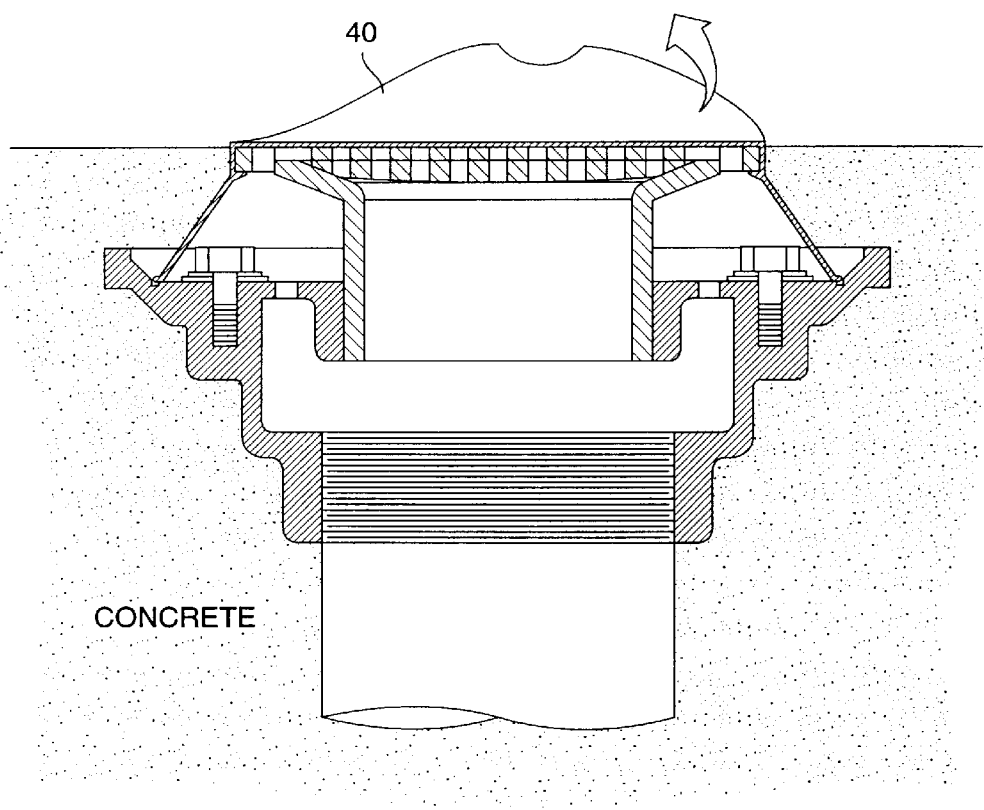
Figure 6C:
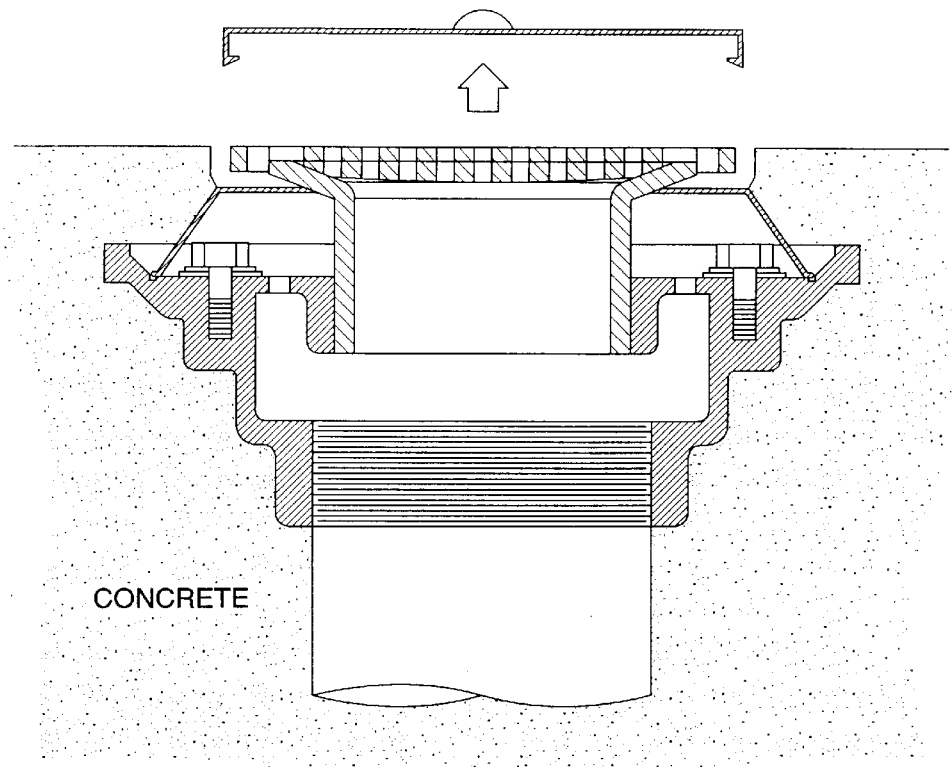
Figure 6D:
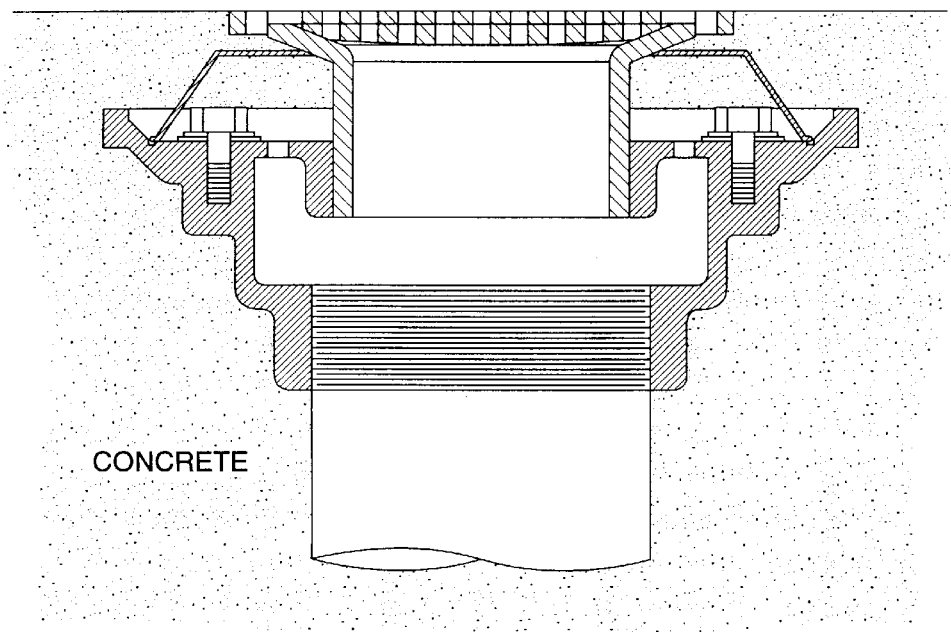

By way of example, to use a device of this embodiment the plumber would first install the cleanout or floor drain on the underlying pipe, and adjust it to ⅛ to ¼ inch below the finished concrete elevation. Next, as illustrated generally in FIG. 6A, the protective cover is pressed onto the fixture until the locking tabs fully engage. Once the protective cover is secured, the concrete floor can be poured and set. After the concrete has cured, the detachable lid can be removed from the top of the protective cover, as illustrated generally in FIG. 6B. If there is a second perforation, as shown in FIG. 6C, the plumber proceeds to remove the top portion of the plastic casing at the second perforation, thereby exposing the annular space around the fixture and allowing vertical adjustment as required for the particular fixture. Finally, after the necessary adjustments are made, the plumber or other construction working can pour finishing grout as required, to complete the floor. See generally FIG. 6D.

The preferred cap protector of the present invention is advantageously constructed of a lightweight, rigid but flexible plastic material such as polypropylene, polystyrene, PVC (polyvinyl chloride, high- and low-density polyethylene, PET (polyethylene petrothylate), ABS (acrylonitrile butadiene stryrene), nylon, polyester and polycarbonate. In addition, a particularly preferred embodiment of the present invention utilizes brightly colored plastics as an aid in preventing damage to embedded plumbing fixtures during floor construction, and to assist in rapidly locating the fixtures once the concrete has set.

As can be seen, the present invention provides a lightweight, disposable protective cover that securely yet releasably attaches to an embedded plumbing fixture during a floor construction project, for example, but allows easy and rapid access to the fixture after the flooring material has dried and set. The present invention has been described in terms of the preferred embodiment. However, one skilled in the art will recognize that it would be possible to construct the elements of the present invention from a variety of materials and to modify the placement of the components in a variety of ways. For instance, while the description above has been generally directed to floor drains and floor cleanouts with a substantially circular shape, the plastic casing and locking tabs of the present invention are easily adaptable to square and rectangular configurations of embedded fixtures as well. Thus, the present invention will find advantageous use with a variety of plumbing fixtures from any number of manufacturers, including, for example, those produced by Smith Industries, Inc. of Montgomery, Ala., as well as Zurn Industries, Josam Sanitary Products, and Wade Manufacturing. While the preferred embodiments have been described in detail and shown in the accompanying drawings, it will be evident that various further modifications are possible without departing from the scope of the invention as set forth in the following claims.

What is claimed is:

1. A disposable protective cover for protecting a plumbing fixture during floor construction, comprising a tubular casing having an end wall closing a first end said tubular casing extending away from said end wall to an open second end, and a plurality of locking tabs evenly disposed around said casing a predetermined distance from said closed end forming a fractionated circle having a smaller diameter than said end wall and casing and sufficient for contacting a rim of said plumbing fixture for releasably securing the rim of said plumbing fixture inside of said tubular casing, wherein said locking tabs are formed on an insert which is mounted adjacent to said closed circular end wall whereby said locking tabs are positioned said predetermined distance from said closed circular end wall.

2. The disposable protective cover of claim 1, additionally including a spacing tab mounted between every two locking tabs, said spacing tabs forming a series of curved contact points creating with said locking tabs said inner fractionated circle.

3. The disposable protective cover of claim 1, wherein said predetermined distance corresponds to the height of a rim of said plumbing fixture such that said locking tabs snap underneath said rim when said tubular casing is pushed fully over said plumbing fixture.

4. The disposable protective cover of claim 1, wherein said closed circular end wall is detachably connected to said casing to form a detachably connected lid.

5. The disposable protective cover of claim 4, wherein the diameter of said detachably connected lid is substantially equal to the diameter of said plumbing fixture.

6. The disposable protective cover of claim 4, wherein the diameter of said detachably connected lid is slightly larger than the diameter of said plumbing fixture.

7. The disposable protective cover of claim 4, wherein said detachably connected lid further comprises a pull tab to enable the lid to be separated from said casing.

8. The disposable protective cover of claim 4, wherein said closed circular end wall is detachably connected by providing perforations to enable removal of said closed circular end wall.

9. The disposable protective cover of claim 8, wherein said perforations are provided in said casing a predetermined distance from said end wall whereby said end wall and a portion of said casing can be removed as a single unit.

10. The disposable protective cover of claim 1 further comprising an outwardly-extending rim circumscribing said second end of said casing.

11. A disposable protective cover for covering a plumbing fixture during floor construction, comprising a plastic tubular casing having a closed end detachably connected to said casing and an open end and a plurality of locking tabs substantially evenly disposed around said casing a predetermined distance from said closed end forming a fractionated circle having a smaller diameter than said casing and sufficient for contacting a rim of said plumbing fixture, each of said locking tabs having an inwardly-extending element for engaging a rim of the plumbing fixture for releasably securing the rim of said plumbing fixture inside of said tubular casing.

12. The disposable protective cover of claim 11 wherein said closed end is detachably connected to said casing by perforations in said casing.

13. The disposable protective cover of claim 11 further comprising an outwardly-extending rim circumscribing said second end of said casing.

14. The disposable protective cover of claim 11 wherein said tubular casing has a circular cross-section.

15. The disposable protective cover of claim 11 additionally comprising a spacing tab mounted between every two locking tabs, said spacing tabs forming a series of curved contact points creating with said locking tabs said inner fractionated circle.

\* \* \* \* \*